(12) United States Patent
Allegretti (10) Patent No.: US 9,650,216 B2
(45) Date of Patent: May 16, 2017

(54) BULK MATERIAL SHIPPING CONTAINER UNLOADER

(71) Applicant: Arrows Up, LLC, Elk Grove Village, IL (US)

(72) Inventor: C. John Allegretti, Barrington Hills, IL (US)

(73) Assignee: Arrows Up, LLC, Arlington Heights, IL (US)

( * ) Notice: Subject to any disclaimer, the term of this patent is extended or adjusted under 35 U.S.C. 154(b) by 0 days.

(21) Appl. No.: 14/158,158

(22) Filed: Jan. 17, 2014

(65) Prior Publication Data

US 2014/0203046 A1    Jul. 24, 2014

Related U.S. Application Data

(60) Provisional application No. 61/755,240, filed on Jan. 22, 2013.

(51) Int. Cl.
| | | |
|---|---|---|
| *B65D 88/00* | (2006.01) | |
| *B65D 88/30* | (2006.01) | |
| *B65G 65/40* | (2006.01) | |
| *B65D 88/02* | (2006.01) | |
| *B65D 88/26* | (2006.01) | |
| *B65D 90/58* | (2006.01) | |

(52) U.S. Cl.
CPC .......... *B65G 65/40* (2013.01); *B65D 88/022* (2013.01); *B65D 88/26* (2013.01); *B65D 90/587* (2013.01)

(58) Field of Classification Search
CPC ...... B65D 90/587; B65D 88/30; B65D 90/14; B65G 65/40; E02F 3/96; E04G 21/025

USPC ............ 222/185.1, 143, 563, 561, 166, 457; 414/722; 206/509, 511, 512; 220/629, 220/636

See application file for complete search history.

(56) References Cited

U.S. PATENT DOCUMENTS

| | | | | |
|---|---|---|---|---|
| 917,646 | A | * | 4/1909 | Otto .............................. 215/202 |
| 2,652,174 | A | * | 9/1953 | Shea ..................... B65D 19/38 206/512 |
| 2,802,603 | A | * | 8/1957 | McCray ..................... 222/185.1 |
| 3,083,879 | A | * | 4/1963 | Coleman ....................... 222/143 |
| 3,151,779 | A | * | 10/1964 | Rensch et al. ................ 222/570 |
| 3,318,473 | A | | 5/1967 | Jones et al. |
| 3,602,400 | A | * | 8/1971 | Cooke .................. B65D 88/128 222/143 |
| 3,785,534 | A | * | 1/1974 | Smith .................. B65D 77/062 206/599 |
| 4,023,719 | A | | 5/1977 | Noyon |
| 4,258,953 | A | | 3/1981 | Johnson |
| 4,398,653 | A | * | 8/1983 | Daloisio ............. B65D 90/205 108/53.1 |
| 4,856,681 | A | * | 8/1989 | Murray ........................ 222/158 |
| 4,956,821 | A | * | 9/1990 | Fenelon .................. B28C 7/067 366/16 |
| 4,993,883 | A | | 2/1991 | Jones |

(Continued)

FOREIGN PATENT DOCUMENTS

GB        2066220 A      7/1981

*Primary Examiner* — Charles P Cheyney
(74) *Attorney, Agent, or Firm* — Neal, Gerber & Eisenberg LLP (57) ABSTRACT

A bulk material shipping container unloader having an expandable supporter, a pallet receiver supported by the extendable supporter, and a material director supported by the pallet receiver.

11 Claims, 7 Drawing Sheets

(56) References Cited

U.S. PATENT DOCUMENTS

| | | | |
|---|---|---|---|
| 5,096,096 A * | 3/1992 | Calaunan | B65G 53/22 |
| | | | 222/185.1 |
| 5,339,996 A * | 8/1994 | Dubbert et al. | 222/185.1 |
| 5,375,730 A | 12/1994 | Bahr et al. | |
| 5,445,289 A * | 8/1995 | Owen | B65D 7/24 |
| | | | 222/105 |
| 5,722,552 A * | 3/1998 | Olson | B65D 90/205 |
| | | | 206/512 |
| 5,927,356 A | 7/1999 | Henderson | |
| 5,997,099 A | 12/1999 | Collins | |
| 6,059,372 A | 5/2000 | McDonald et al. | |
| 6,247,594 B1 * | 6/2001 | Garton | B65D 19/04 |
| | | | 206/512 |
| 6,568,567 B2 | 5/2003 | McKenzie et al. | |
| 6,622,849 B1 | 9/2003 | Sperling | |
| 7,284,579 B2 * | 10/2007 | Elgan | B65D 77/061 |
| | | | 141/10 |
| 7,475,796 B2 | 1/2009 | Garton | |
| 7,762,281 B2 | 7/2010 | Schuld | |
| 8,505,780 B2 | 8/2013 | Oren | |
| 8,585,341 B1 | 11/2013 | Oren et al. | |
| 8,607,289 B2 | 12/2013 | Brown et al. | |
| 8,616,370 B2 | 12/2013 | Allegretti et al. | |
| 8,622,251 B2 | 1/2014 | Oren | |
| 8,668,430 B2 | 3/2014 | Oren et al. | |
| 8,827,118 B2 | 9/2014 | Oren | |
| 9,522,816 B2 * | 12/2016 | Taylor | B66F 9/065 |
| 2009/0129903 A1 * | 5/2009 | Lyons, III | B60P 1/56 |
| | | | 414/332 |
| 2011/0127178 A1 * | 6/2011 | Claussen | 206/216 |
| 2012/0152798 A1 | 6/2012 | Allegretti et al. | |

* cited by examiner

BULK MATERIAL SHIPPING CONTAINER UNLOADER

PRIORITY

This application is a non-provisional of, claims priority to, and the benefit of U.S. Provisional Patent Application Ser. No. 61/755,240, filed Jan. 22, 2013, the entire contents of which are incorporated herein by reference.

BACKGROUND

Various bulk material shipping containers are known. Such known material bulk shipping containers, sometimes referred to herein for brevity as known containers or as known bulk containers, are used to transport a wide range of products, parts, components, items, and materials such as, but not limited to, seeds, shavings, fasteners, and granular materials. These are sometimes called loose materials. There are various disadvantages with such known bulk material shipping containers.

For example, one known and widely commercially used known bulk container for shipping materials (such as shipping seeds to farms) is sold by Buckhorn Industries. This known bulk container is made from plastic, weighs about 338 pounds (151.9 kilograms), and holds a maximum of 58.3 cubic feet of material. This known container has a bottom section, a top section, and a cover. To use this known container, loaders at a bulk material supplier must remove the cover, remove the top section from the bottom section, flip the top section upside down, place the flipped top section on the bottom section, fill the container, and then place the cover on the flipped top section. This process requires at least two people and a relatively significant amount of time when filling a large quantity of these containers. In certain instances, specifically configured forklift attachments are required to fill and handle this known container. After this known container is shipped to its ultimate destination (such as a farm), the bulk material (such as seed) is unloaded from the container, and the empty container must be shipped back to the material supplier. However, prior to and for shipping back to the supplier, the cover is removed, the flipped top section is removed from the bottom section, the flipped top section is then flipped back over and placed on the bottom section, and the cover is then placed on the top section and fastened with zip ties. This process also requires at least two people and is relatively time consuming especially for a large quantity of such containers.

Another disadvantage of this known container is that this container is made from plastic and if one or more of the three sections of the container (i.e., the bottom, the top, or the cover) is damaged or cracked, than that entire damaged or cracked section typically must be replaced (instead of being repaired). This adds additional cost, time out of service for the damaged container, and additional material and energy waste.

Another disadvantage of this known container is that when disassembled (for shipping empty), only two of these containers can be stacked on top of each other and still fit in a conventional shipping container or truck. This tends to leave wasted space in such shipping containers and trucks, and thus increases the overall cost of shipping (including related fuel costs) and energy waste.

Additional disadvantages of this known container are that: (a) the cover can be easily lost or misplaced; (b) the cover can be easily damaged; (c) this known container is less weather resistant because the cover is readily removable and only attached by zip ties; (d) the insides and outside surfaces are difficult to clean; (e) a material holding bag is not readily usable with this container, such that this container can not be used for certain types of loose materials; and (f) the contents held by the container can be easily contaminated due in part to the configuration and use of the lid.

To solve these problems, new bulk material shipping containers have been developed, such as those disclosed in U.S. Patent Publication No. 2012/0103848 and U.S. Patent Publication No. 2012/0152798, which are owned by the assignee of the present application.

One issue that has arisen with respect to these new bulk material shipping containers is in the unloading of the materials from these new containers. In various uses, certain of these new bulk material shipping containers need to be supported above the ground to be unloaded. One way this had been done is by using a fork lift to hold the container above the ground in the unloading area during the unloading process. This is not preferred and ties up the use of the fork lift. Another issue that has arisen with respect to these new bulk material shipping containers is that they tend to unload the contents fairly quickly, and thus they may not work optimally in certain situations where the contents need to be unloaded slowly or in batches.

Accordingly, there is a need for a bulk material shipping container unloading apparatus.

SUMMARY

Various embodiments of the present disclosure provide a bulk material shipping container unloader which solves the above issues. The bulk material shipping container unloader of the present disclosure may sometimes be referred herein for brevity as the shipping container unloader, the container unloader, the material unloader, or the unloader.

In one embodiment, the bulk material shipping container unloader of the present disclosure includes: (a) a supporter; (b) a pallet receiver supported by the supporter; and (c) a material director supported by the pallet receiver. In this embodiment, the height of the pallet receiver and the material director are fixed, and thus support the bulk material container at a single position or height.

In another embodiment, the bulk material shipping container unloader of the present disclosure includes: (a) an expandable supporter; (b) a pallet receiver supported by the extendable supporter; and (c) a material director supported by the pallet receiver. The expandable supporter is movable from a retracted position to one or more expanded positions to change the height of the pallet receiver and the material director, and thus to support the bulk material container at different desired positions or heights.

In either of these embodiments, the shipping container unloader of the present disclosure is configured to receive and hold a bulk material shipping container which is configured to directly hold materials or to receive a suitable plastic bag or liner which holds the materials in the container. The shipping container unloader of the present disclosure is configured to hold one shipping container or multiple stacked shipping containers as further discussed below. The shipping container unloader of the present disclosure is also configured to hold one or more expandable shipping containers and/or one or more bulk material shipping containers that are not expandable or retractable.

One embodiment of the shipping container unloader of the present disclosure is primarily made from a suitable steel. In this embodiment, if one of the sections of the unloader is damaged or cracked, that section can typically be repaired which reduces: (a) cost; (b) time out of service for the unloader; and (c) additional material and/or energy waste. In alternative embodiments, the shipping container unloader of the present disclosure or certain parts thereof, can be made from a suitably strong plastic material such as a composite material or a fiber glass material.

Additional features and advantages of the present invention are described in, and will be apparent from, the following Detailed Description of Exemplary Embodiments and the figures.

DETAILED DESCRIPTION OF EXEMPLARY EMBODIMENTS

Figure 6:
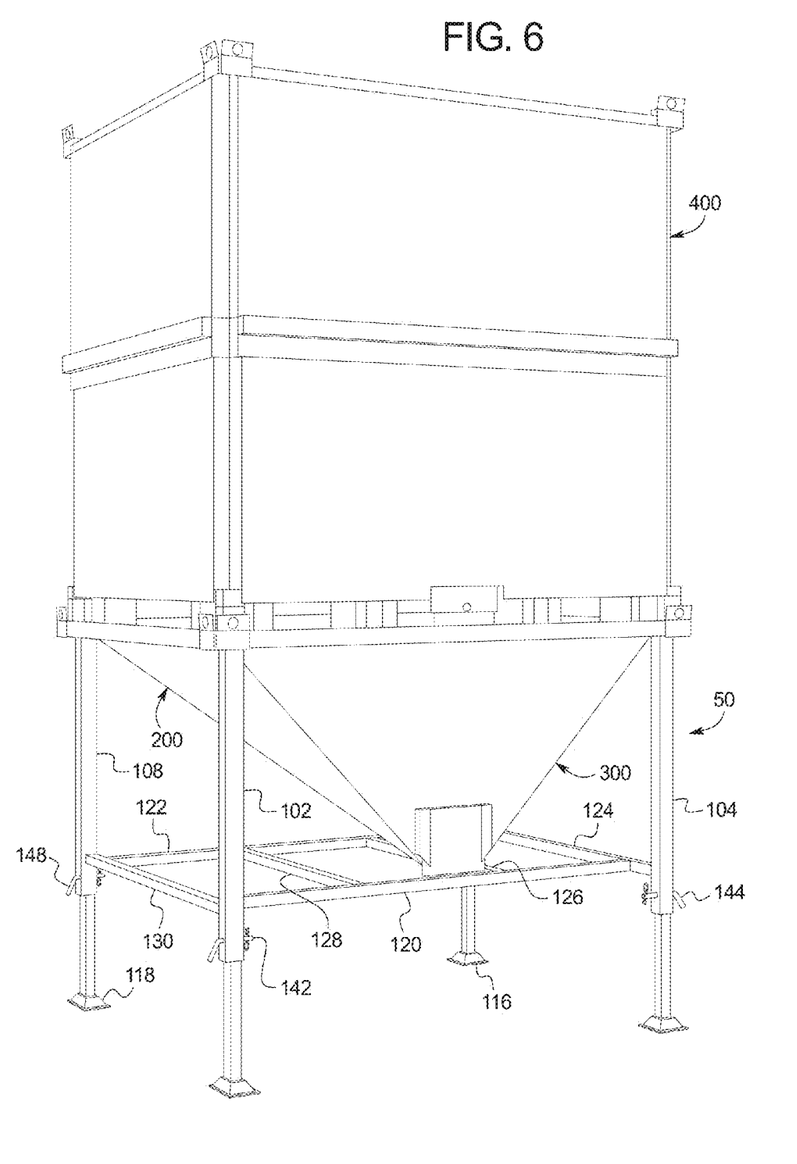
FIG. 6 is a front perspective view of the bulk material shipping container unloader of FIG. 1, shown in an expanded position and shown supporting a bulk material shipping container.
Figure 7:
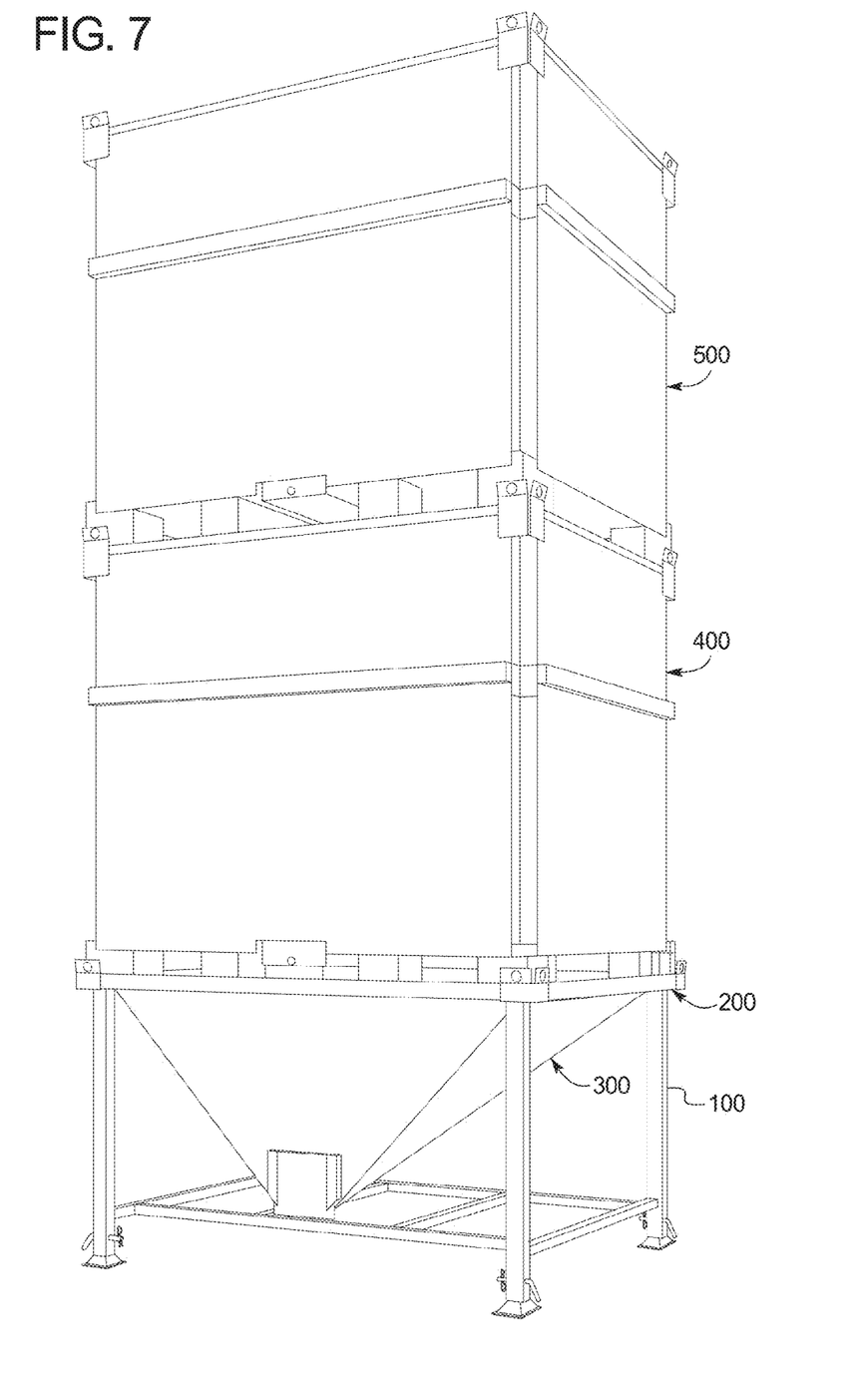
FIG. 7 is a fragmentary front perspective view of the bulk material shipping container unloader of FIG. 1, shown supporting two stacked bulk material shipping containers.

Referring now to the drawings, FIGS. 1 to 7 illustrate one example embodiment of the bulk material shipping container unloader of the present disclosure, which is generally indicated by numeral 50. This illustrated embodiment of the bulk material shipping container unloader 50 generally includes: (a) an expandable or extendable supporter 100; (b) a pallet receiver 200 supported by the expandable or extendable supporter 100; and (c) a material director 300 supported by the pallet receiver 200. Generally, the expandable supporter 100 is configured to support the pallet receiver 200 and the material director 300, the pallet receiver 200 is configured to support one or more bulk material shipping containers 400 and 500 (as shown in FIGS. 6 and 7), and the material director 300 is configured to hold and direct material exiting the bulk material shipping container to and through a material unloading port as further explained below. As mentioned above, for brevity, the bulk material shipping container unloader of the present disclosure is sometimes referred to as the shipping container unloader, the container unloader, the material unloader, or the unloader. It should also be appreciated that while this illustrated embodiment of the unloader is expandable, the bulk material shipping container unloader of the present disclosure does not have to be expandable.

In this illustrated embodiment, the expandable supporter 100 is movable from a retracted position (shown in FIGS. 1, 2, and 3) to one or more expanded positions (shown in FIG. 6) to change the height of the pallet receiver 200 and the material director 300. More specifically, the expandable or extendable supporter 100 includes: (a) expandable legs 102, 104, 106, and 108; (b) feet 112, 114, 116, and 118 respectively attached to the bottom of the legs 102, 104, 106, and 108; (c) leg stabilizers 120, 122, 124, 126, 128, and 130 attached to the legs 102, 104, 106, and 108; and (d) locking members 142, 144, 146, and 148 configured to respectively hold the legs 102, 104, 106, and 108 in the expanded and retracted positions.

In this illustrated embodiment, the expandable legs 102, 104, 106, and 108 each include telescoping upper and lower sections with alignable openings that provide for the expansion or height adjustment of the pallet receiver 200 and material director 300. The locking members 142, 144, 146, and 148 are configured to extend through the aligned openings to hold the legs 102, 104, 106, and 108 in the expanded and retracted positions. In this illustrated embodiment each locking member includes a J-pin (configured to be positioned though aligned openings) and a locking pin which holds the J-pin in place. The J-pins are made from as suitably strong material (such as steel) to support the weight of the containers placed on the unloader 50 when the unloader 50 is in the expanded position. It should be appreciated that other suitable locking members may be employed in accordance with the present disclosure.

In this illustrated embodiment, the legs 102, 104, 106, and 108 and the leg stabilizers 120, 122, 124, 126,128, and 130 are each made from a steel tubular material, and the leg stabilizers are welded to the upper sections of the legs 102, 104, 106, and 108 to provide a suitable support structure for the loader 50. It should also be appreciated that the feet 112, 114, 116, and 118 are also made of steel and welded or otherwise suitably respectively attached to the legs 102, 104, 106, and 108 in this illustrated embodiment.

It should be appreciated that these components are made from steel to: (a) facilitate attachment or connection of these components by welding and/or suitable fasteners; (b) provide structural strength and rigidity; (c) facilitate ease of cleaning; (d) facilitate ease of repair; and (e) minimize overall weight of the unloader. However, it should be appreciated that in alternative embodiments, one or more of these components can be made from other suitably strong materials and can be attached in other suitable manners (besides welding).

The pallet receiver 200 is configured to receive and support a pallet of a bulk material shipping container (as generally shown in FIGS. 6 and 7). More specifically, the pallet receiver 200 includes: (a) pallet support bases 202, 204, 206, and 208; (b) pallet holding walls 212, 214, 216, and 218 respectively connected to and extending upwardly from the pallet support bases 202, 204, 206, and 208; (c) nesting or stacking guides 222, 224, 226, and 228 respectively connected to and extending upwardly from the corners of the pallet holding walls 212, 214, 216, and 218; and (d) nesting supports 232a, 232b, 234a, 234b, 236a, 236b, 238a and 238b, respectively connected to and extending upwardly from the pallet support bases 202, 204, 206, and 208.

In this illustrated embodiment, (a) the pallet support base 202 and the pallet holding wall 212; (b) the pallet support base 204 and the pallet holding wall 214; (c) the pallet support base 206 and the pallet holding wall 216; and (d) the pallet support base 208 and the pallet holding wall 218, are each made of steel, formed together, and respectively welded together at their corners. In this illustrated embodiment, the nesting or stacking guides 222, 224, 226, and 228 are also made of steel and welded to the corners of the pallet holding walls 212, 214, 216, and 218. In this illustrated embodiment, the nesting supports 232a, 232b, 234a, 234b, 236a, 236b, 238a, and 238b, are each made from a steel tube and welded to the pallet support bases 202, 204, 206, and 208.

It should be appreciated that these components are made from steel to: (a) facilitate attachment or connection of these components by welding and/or suitable fasteners; (b) provide structural strength and rigidity; (c) facilitate ease of cleaning; (d) facilitate ease of repair; and (e) minimize overall weight of the unloader. However, it should be appreciated that in alternative embodiments, one or more of these components can be made from other suitably strong materials and can be attached in other suitable manners (besides welding).

It should be appreciated that when a container sits on the unloader 50 as generally illustrated in FIGS. 6 and 7, the pallet of the container rests on the nesting supports 232a, 232b, 234a, 234b, 236a, 236b, 238a, and 238b, which are configured to support the pallet and specifically the legs or footing of the pallet of the container. The nesting supports direct the weight of the second or top container that sits on those nesting supports to the corners of the unloader and thus to the legs of the unloader. This prevents the weight of the container from damaging the walls of the unloader.

It should be appreciated that the unloader and the nesting or stacking guides are configured to assist the unloader and specifically the pallet receiver 200 to receive known bulk material containers (such as the known bulk material container described in the background section of this document and described below). It should be appreciated that the unloader of the present disclosure is configured such that a fork lift can be employed to place a container on top of the unloader and to lift one container from the unloading assembly without damaging the unloader as further described below.

The material director 300 is supported by the pallet receiver 200 and is configured to direct material exiting the bulk material shipping container resting on the unloader to an exit area and specifically through a material unloading port 350. More specifically, material director 300 includes: (a) a front downwardly (e.g., vertically or substantially vertically) extending material directing wall 312 connected to the front pallet support base 202; (b) a rear downwardly slopping material directing wall 316 connected to the rear pallet support base 206; (c) a first downwardly (e.g., angled or sloped) extending side material directing wall 314 connected to the side pallet support base 204; (d) a second downwardly (e.g., angled or sloped) extending material directing side wall 308 connected to the side pallet support base 208; and (e) and a material unloading port 350 formed in the front material directing wall 312.

Figure 1:
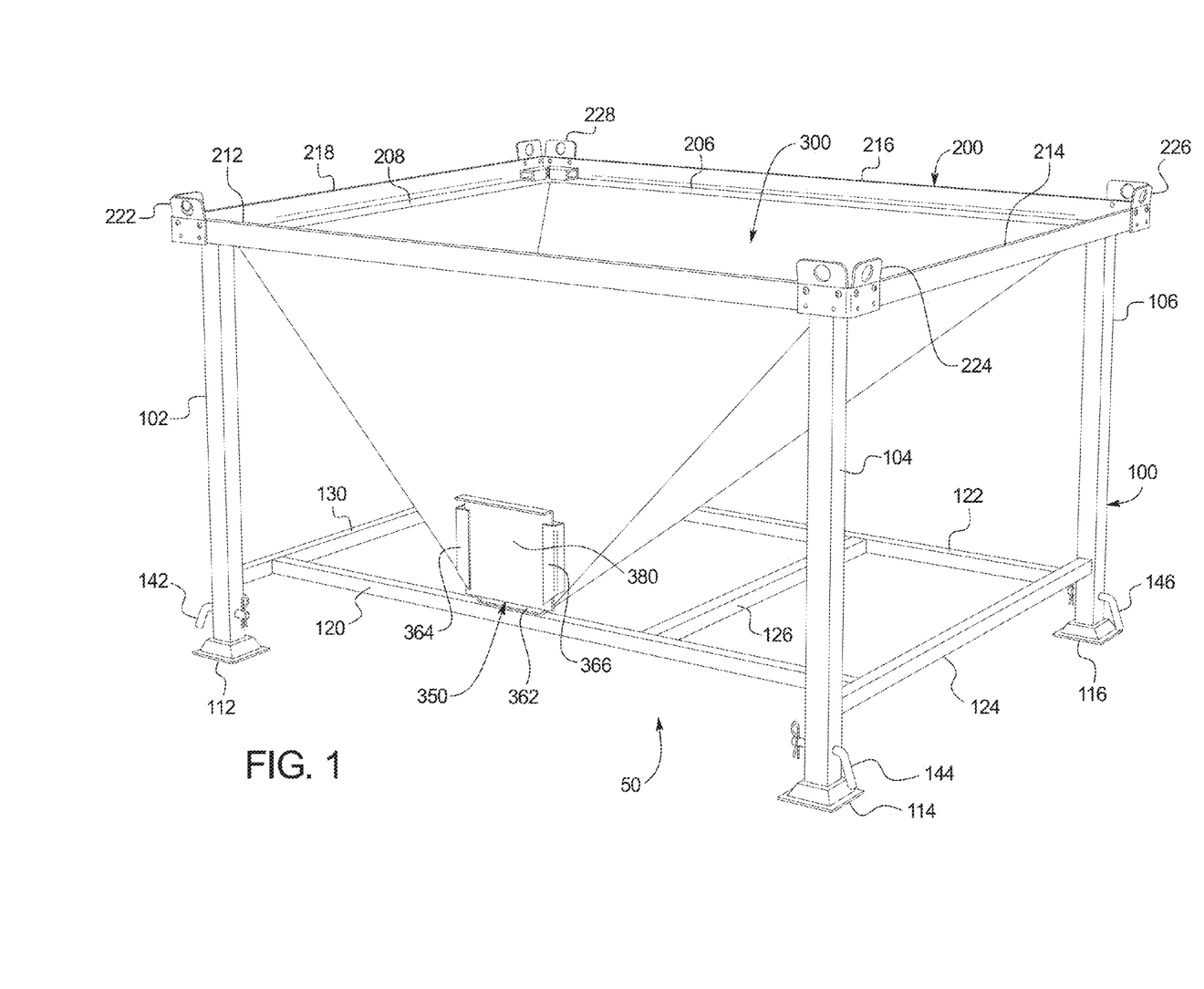
FIG. 1 is a front perspective view of the bulk material shipping container unloader of one embodiment of the present disclosure, shown in a retracted position, and shown with a closure plate coupled to the material unloading port of the material director.
Figure 2:
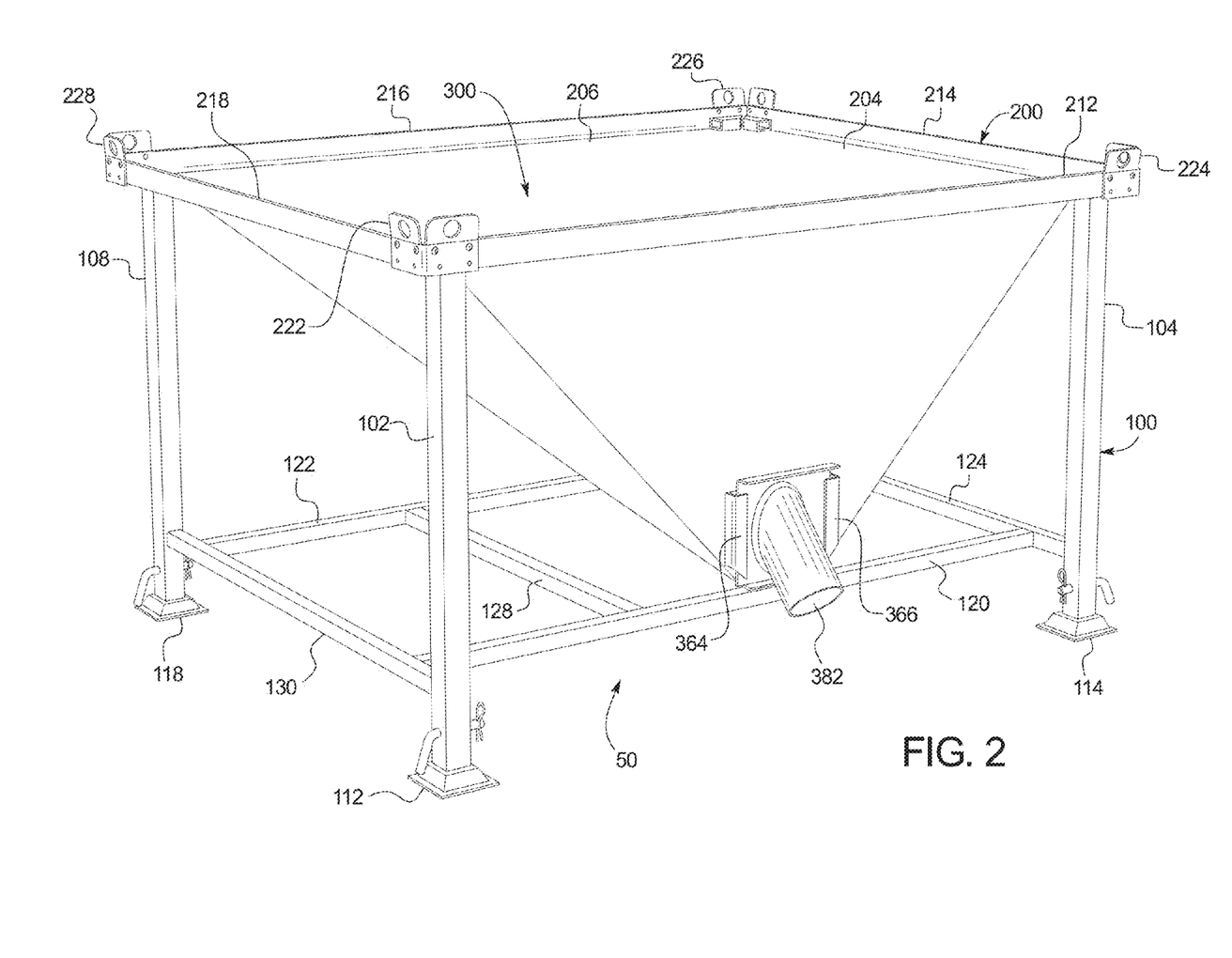
FIG. 2 is a front perspective view of the bulk material shipping container unloader of FIG. 1, shown in a retracted position and shown with an output nozzle coupled to the material unloading port of the material director.
Figure 3:
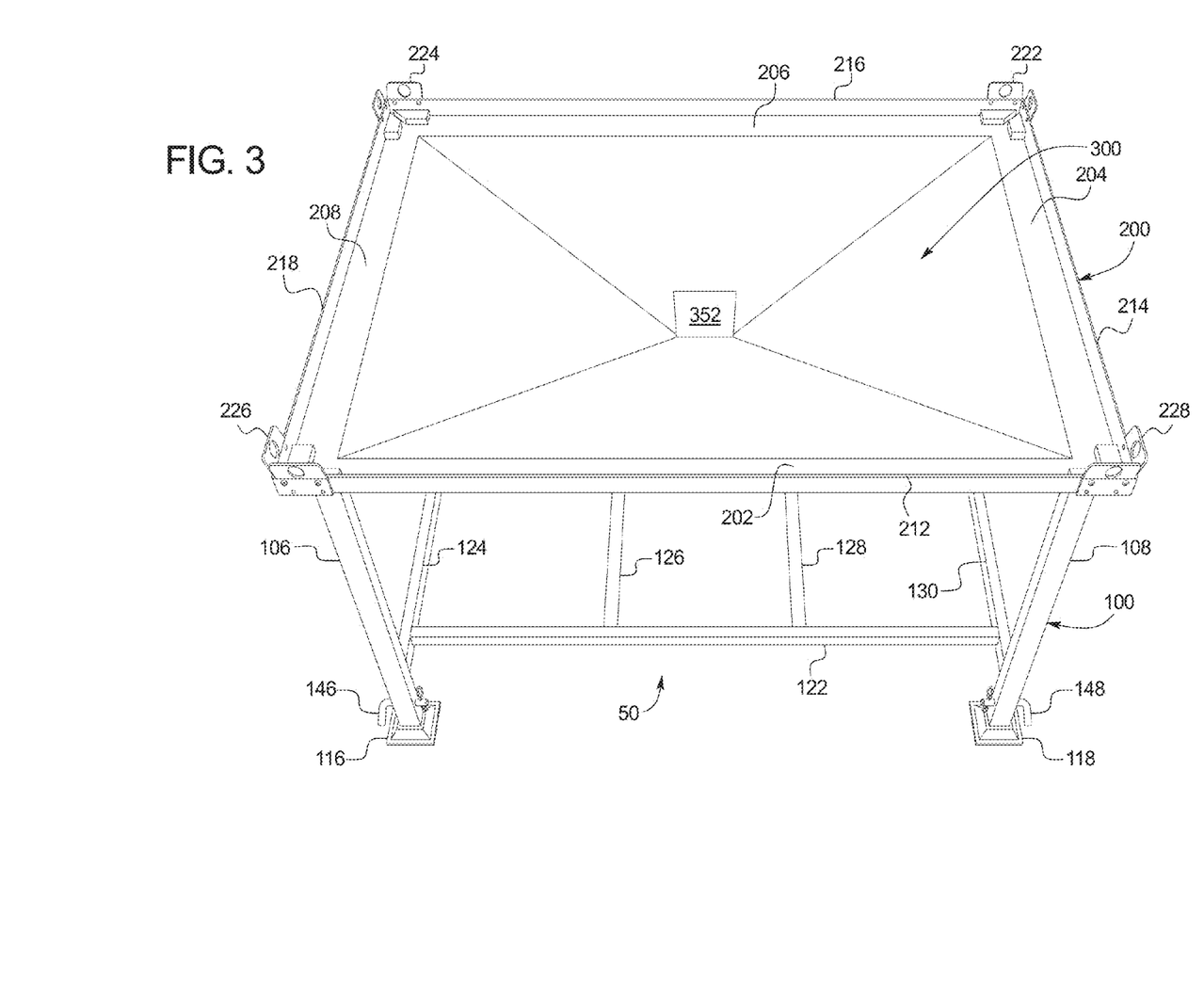
FIG. 3 is a top rear perspective view of the bulk material shipping container unloader of FIG. 1, shown in a retracted position and shown with an open material unloading port of the material director.
Figure 4:
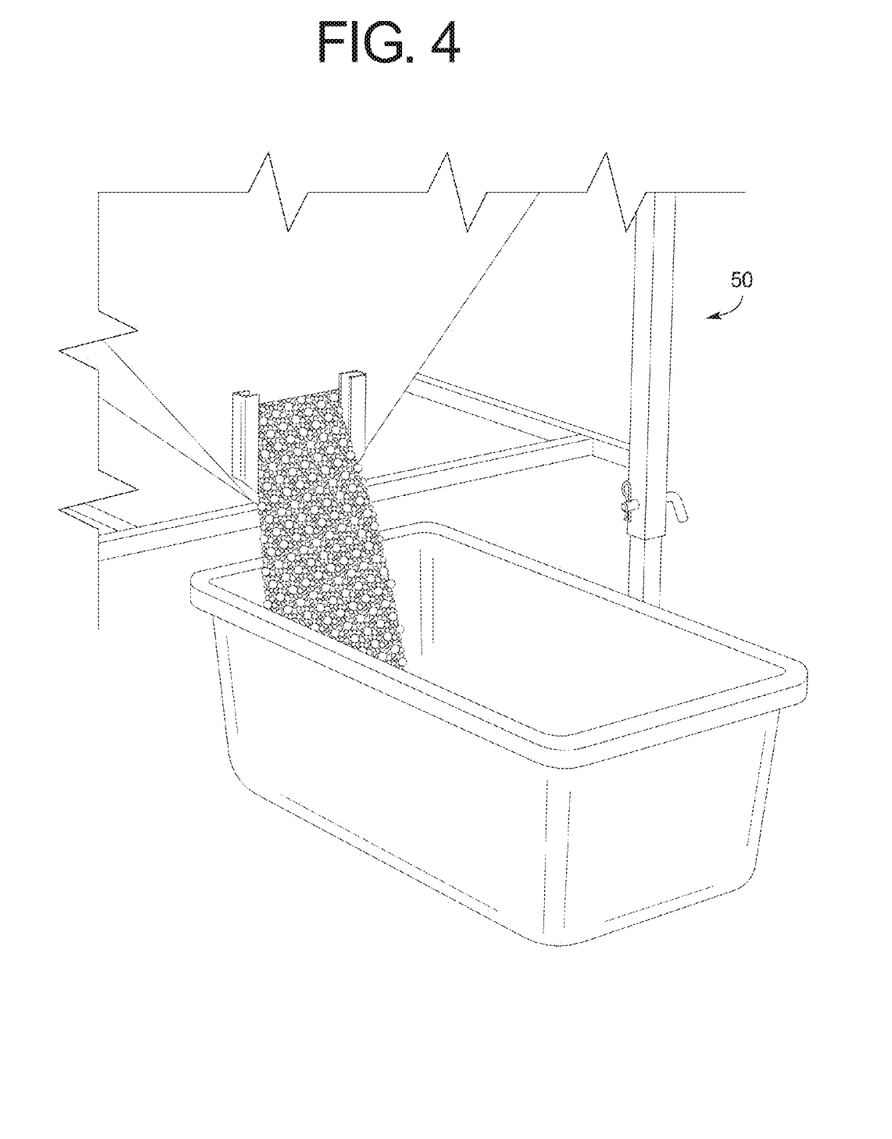
FIG. 4 is an enlarged fragmentary perspective view of the material unloading port of the material director of the bulk material shipping container unloader of FIG. 1, and showing material flowing out through the material unloading port into a bin.
Figure 5:
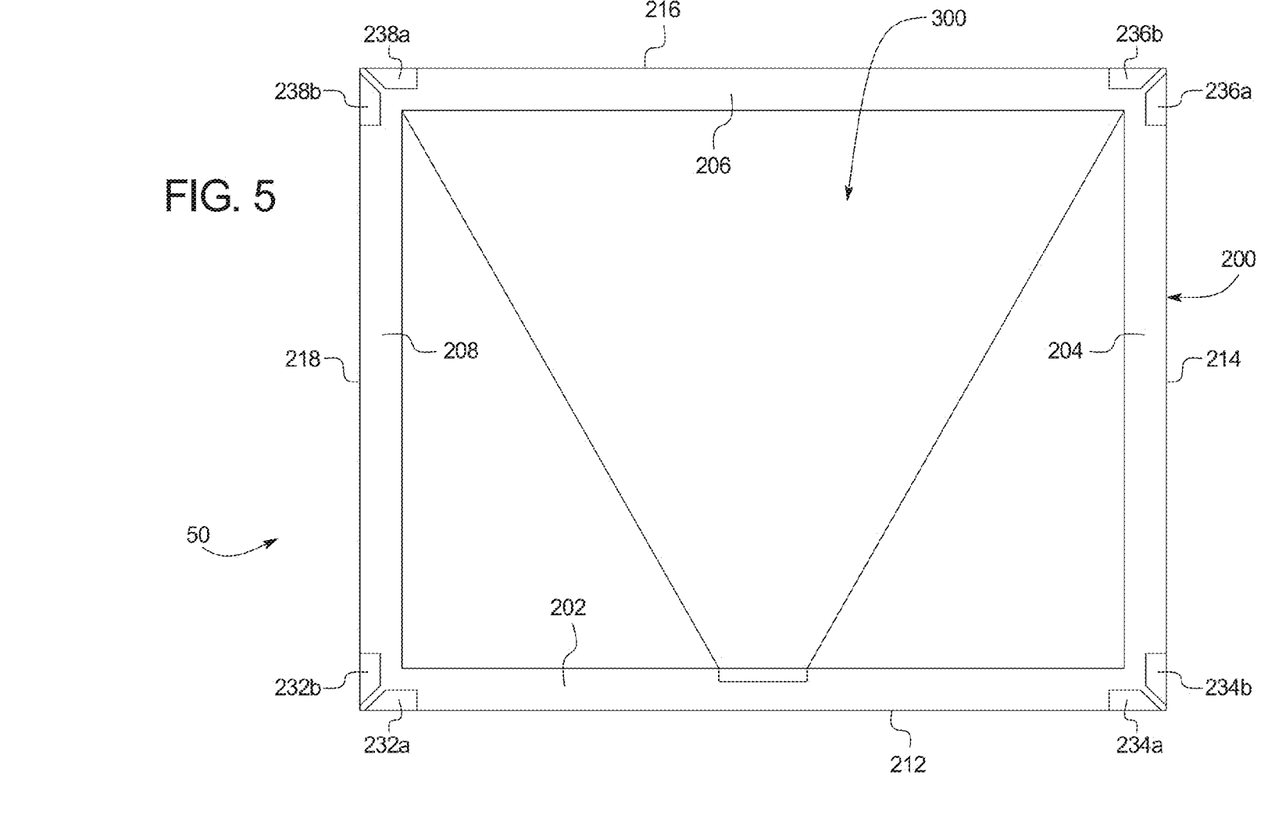
FIG. 5 is a top plan view of the bulk material shipping container unloader of FIG. 1.

The material director 300 additionally includes one or more components that are configured to be coupled with the material unloading port 350. More specifically, the material unloading port 350 includes: (a) a section of the wall 312 which defines an opening 352; (b) a bottom guide or rail 362 positioned below the opening 352; (c) a first side guide or rail 364 positioned on one side of the opening 352; and (d) a second side guide or rail 366 positioned on the other side of the opening. The bottom guide or rail 362, the first side guide or rail 364, and the second side guide or rail 366 are connected to and extend outwardly from the wall 312 and are configured to receive and hold a plurality of different removable components that facilitate operation of the material unloading port 350 and the unloader 50. These components include: (a) a closure plate 380 which is configured to be received and held by the rails 362, 364 and 366 and close the opening 352 as shown in FIG. 1; and (b) a nozzle plate 382 which is configured to be received and held by the rails 362, 364 and 366 as shown in FIG. 2 and to provide a controlled flow (or controlled flow rate) of materials through the opening 352 of the material unloading port 350. It should be appreciated that the present disclosure also contemplates other components such as other nozzle plates with different size and shaped nozzles to regulate material flow or flow rate. It should also be appreciated that the closure plate can be removed and no nozzle plate inserted to facilitate more rapid empting of the materials through the opening 352 of the material unloading port 350 as generally illustrated in FIG. 4.

In this illustrated embodiment, (a) the front wall 312; (b) the rear wall 316; (c) the first side wall 314; and (d) the second side wall 318 are each made of steel and respectively welded together. In this illustrated embodiment, the rails 362, 364 and 366 are each made of steel and integrally formed from or welded to the front wall 312. In this illustrated embodiment, the closure plate 380 and the nozzle plate 380 are each made of steel. It should be appreciated that these components are made from steel to: (a) facilitate attachment or connection of these components by welding and/or suitable fasteners; (b) provide structural strength and rigidity; (c) facilitate ease of cleaning; (d) facilitate ease of repair; and (e) minimize overall weight of the unloader. However, it should be appreciated that in alternative embodiments, one or more of these components can be made from other suitably strong materials and can be attached in other suitable manners (besides welding).

Turning now specifically to FIGS. 6 and 7, this illustrated embodiment of the bulk material shipping container unloader 50 of the present disclosure is configured to hold one or more bulk material shipping containers 400 and 500 (such as those described in U.S. Patent Publication No. 2012/0103848 and U.S. Patent Publication No. 2012/0152798). In certain versions, these shipping containers have as an expanded position for holding materials during shipping and a retracted position for efficient shipping when the container is not holding materials or when the container is holding a smaller amount of materials. In certain versions, these shipping containers are not expanded or retractable.

Generally, as shown in these published patent applications, the expandable shipping containers each generally includes: (a) a pallet; (b) a bottom compartment; (c) a top compartment; (d) a plurality of top compartment support assemblies; (e) a material unloading assembly; (f) a material loading assembly; and (g) a top compartment extension assembly configured to enable a user to move the top compartment from the retracted position to the expanded position.

It should also be appreciated that the unloader of the present disclosure is configured to hold a shipping container that includes a bottom compartment having: (a) a bottom wall with a selectively openable suitable material release opening; and (b) a door or gate (with a handle) that is movable or slidable from a closed position to a plurality of different partially open positions, and then to a fully open position.

As mentioned above, the unloader of the present disclosure and specifically the pallet receiver 200 is configured to receive a pallet of a shipping container (as generally shown in FIGS. 6 and 7) and specifically configured to take in account that a lifting and moving vehicle such as fork lift will be used to lift and move the shipping container onto the unloader, and thereby provide sufficient spaces for the forks as generally illustrated in FIGS. 6 and 7. In other words, the pallet holding walls 212, 214, 216, and 218 are of a limited height to prevent interference with the fork lift tines which carry the container and place the container on the material unloader 50, regardless of the direction of the fork lift relative to the unloader 50 and the container.

The unloader of the present disclosure is configured to receive a shipping container pallet: (a) that includes a rectangular body having an upper surface, a lower surface, a front edge, a back edge, and opposite side edges; (b) that includes a plurality of legs extending downwardly from the body, where the legs each respectively extend the entire width of the body of the pallet, and where the legs extend downwardly from the central portions of the side ends of the body; and (c) where pallet includes or defines multiple sets of aligned fork lift tine receiving channels.

The unloader of the present disclosure is also configured to receive a shipping container pallet: (a) that includes a rectangular body having an upper surface, a lower surface, a front edge, a back edge, and opposite side edges; (b) a plurality of legs attached to and extending downwardly from the body; (c) a footing attached to and extending downwardly from each of the legs and having an upper surface, a lower surface, a front edge, a back edge, and opposite side edges; and (d) where pallet includes or defines multiple sets of aligned fork lift tine receiving channels, and the footing has a smaller rectangular footprint than the body and the legs to enable the pallet, and specifically legs of the pallet, to sit on the nesting supports of the unloading assembly.

It should thus be appreciated that the material unloader of the present disclosure and specifically the pallet receiver is configured to supports different pallets or pallets that have different configurations and thus different shipping or other containers.

In one embodiment, the unloader of the present disclosure is configured to hold an expandable bulk material shipping container having: (a) a pallet which is approximately 56 inches (142.24 centimeters) by approximately 44 inches (111.76 centimeters) by approximately 6 inches (15.24 centimeters); (b) a bottom compartment which is approximately 56 inches (142.24 centimeters) by approximately 44 inches (111.76 centimeters) by approximately 27 inches (68.58 centimeters); and (c) a top compartment which is approximately 56 inches (142.24 centimeters) by approximately 44 inches (111.76 centimeters) by approximately 27 inches (68.58 centimeters), wherein (d) the container in the retracted position is approximately 56 inches (142.24 centimeters) by approximately 44 inches (111.76 centimeters) by approximately 35 inches (88.90 centimeters); and (e) the container in the expanded position is approximately 56 inches (142.24 centimeters) by approximately 44 inches (111.76 centimeters) by approximately 62 inches (157.48 centimeters). However, it should be appreciated that the unloader of the present disclosure is configured to hold containers of other suitable sizes.

FIGS. 6 and 7 also illustrate that one or more shipping containers (such as containers 400 and 500) can be stacked on the unloader. In FIG. 6, when the gate of the container 400 is opened, the material from the container 400 will flow into the material director 300 and out of the material unloading port 350. In FIG. 7, when the gate of the container 400 is opened, the material from the container 400 will flow into the material director 300 and out of the material unloading port 350, and additionally when the gate of the container 500 is opened, the material from the container 5400 will flow into the container 400, and then into the material director 300 and out of the material unloading port 350.

It should be understood that modifications and variations may be effected without departing from the scope of the novel concepts of the present disclosure, and it should be understood that this application is to be limited only by the scope of the appended claims.

The invention is claimed as follows:

1. A bulk material shipping container unloader configured to support a bulk material shipping container including a pallet having a plurality of bottom corner legs, the plurality of bottom corner legs including a first bottom corner leg, a second bottom corner leg, a third bottom corner leg, and a fourth bottom corner leg, the bulk material shipping container unloader comprising:

(a) a supporter movable from a retracted position to at least one expanded position, the supporter including: a plurality of expandable legs each including telescoping upper and lower sections, a plurality of feet respectively attached to the legs, and a plurality of locking members configured to respectively hold the legs in the at least one expanded position;

(b) a pallet receiver supported by the supporter and configured to receive and support the pallet of the bulk material shipping container, the pallet receiver including: (i) a plurality of pallet support bases including a front pallet support base, a rear pallet support base spaced apart from the front support base, a first side pallet support base connected to the front pallet support base and the rear pallet support base, and a second side pallet support base spaced apart from the first side pallet support base and connected to the front pallet support base and the rear pallet support base, (ii) a plurality of stacking guides respectively connected to and extending above a plurality of the pallet support bases, (iii) a plurality of the pallet support bases, and (iv) a plurality of nesting supports respectively connected to and extending upwardly from upper surfaces of the pallet support bases, said plurality of nesting supports including a first nesting support configured to engage a bottom surface of the first bottom corner leg of the pallet of the bulk material shipping container, a second nesting support configured to engage a bottom surface of the second bottom corner leg of the pallet of the bulk material shipping container, a third nesting support configured to engage a bottom surface of the third bottom corner leg of the pallet of the bulk material shipping container, and a fourth nesting support configured to engage a bottom surface of the fourth bottom corner leg of the pallet of the bulk material shipping container; and (c) a material director fixedly connected to the pallet receiver by welding or fasteners and supported by the pallet receiver, said material director defining an opening, and including (i) a first downwardly extending material directing wall,
(ii) a spaced apart second downwardly extending material directing wall,
(iii) a first downwardly extending material directing side wall integrally connected to the first downwardly extending material directing wall and the second downwardly extending material directing wall, and (iv) a spaced-apart second downwardly extending material directing side wall integrally connected to the first downwardly extending material directing wall and the second downwardly extending material directing wall, and wherein said first downwardly extending material directing wall, said second downwardly extending material directing wall, said first downwardly extending material directing side wall and said second downwardly extending material directing side wall define a chamber having a fixed shape for directing material from the bulk material shipping container that moves through the pallet of the bulk material shipping container supported by the pallet receiver and then through the chamber.

2. The bulk material shipping container unloader of claim 1, wherein the supporter includes a plurality of leg stabilizers attached to the legs.

3. The bulk material shipping container unloader of claim 1, wherein the front downwardly extending material directing wall defines a material unloading port which defines the opening.

4. The bulk material shipping container unloader of claim 3, wherein the material receiver includes a bottom rail, a first side rail, and a second side rail configured to receive and hold a plurality of different removable components that facilitate operation of the material unloading port.

5. The bulk material shipping container unloader of claim 4, which includes a removable closure plate which is configured to be received and held by said bottom rail, said first side rail, and said second side rail.

6. The bulk material shipping container unloader of claim 4, which includes a nozzle plate which is configured to be received and held by said bottom rail, said first side rail, and said second side rail.

7. A bulk material shipping container unloader configured to support a bulk material shipping container including a pallet having a plurality of bottom corners legs, the plurality of bottom corners legs including a first bottom corner leg, a second bottom corner leg, a third bottom corner leg, and a fourth bottom corner leg, the bulk material shipping container unloader comprising:

(a) a supporter movable from a retracted position to at least one expanded position, wherein the supporter includes a plurality of expandable legs each including telescoping upper and lower sections, a plurality of feet respectively attached to the legs, a plurality of locking members configured to respectively hold the legs in at least one expanded position, and a plurality of leg stabilizers attached to the legs;

(b) a pallet receiver supported by the supporter and configured to receive the pallet of the bulk material shipping container, wherein the pallet receiver includes a plurality of pallet support bases, a plurality of pallet holding walls respectively connected to and extending upwardly from the pallet support bases including a front pallet support base, a rear pallet support base spaced apart from the front support base, a first side pallet support base connected to the front pallet support base and the rear pallet support base, and a second side pallet support base spaced apart from the first side pallet support base and connected to the front pallet support base and the rear pallet support base, a plurality of stacking guides respectively connected to and extending upwardly from corners of the pallet holding walls, and a plurality of nesting supports respectively connected to and extending upwardly from upper surfaces of the pallet support bases, said plurality of nesting supports including a first nesting support configured to engage a bottom surface of the first bottom corner leg of the pallet of the bulk material shipping container, a second nesting support configured to engage a bottom surface of the second bottom corner leg of the pallet of the bulk material shipping container, a third nesting support configured to engage a bottom surface of the third bottom corner leg of the pallet of the bulk material shipping container, and a fourth nesting support configured to engage a bottom surface of the fourth bottom corner leg of the pallet of the bulk material shipping container; and (c) a material director fixedly connected to the pallet receiver by welding or fasteners and supported by the pallet receiver, said material director including a front downwardly extending material directing wall, a spaced-apart rear downwardly slopping material directing wall, a first downwardly extending material directing side wall, and a spaced-apart second downwardly extending material directing side wall, said first downwardly extending material directing side wall integrally connected to the first downwardly extending material directing wall and the second downwardly extending material directing wall, said second downwardly extending material directing side wall integrally connected to the first downwardly extending material directing wall and the second downwardly extending material directing wall, and wherein said first downwardly extending material directing wall, said second downwardly extending material directing wall, said first downwardly extending material directing side wall and said second downwardly extending material directing side wall define a chamber having a fixed shape for directing material from the bulk material shipping container that moves through the pallet of the bulk material shipping container supported by the pallet receiver and then through the chamber.

8. The bulk material shipping container unloader of claim 7, which includes a removable closure plate which is configured to be received and held by a bottom rail, a first side rail, and a second side rail.

9. The bulk material shipping container unloader of claim 8, which includes a nozzle plate which is configured to be received and held by said bottom rail, said first side rail, and said second side rail.

10. The bulk material shipping container unloader of claim 1, wherein the first downwardly extending material directing side wall and the second downwardly extending material directing side wall extend downwardly toward each other.

11. The bulk material shipping container unloader of claim 7, wherein the first downwardly extending material directing side wall and the second downwardly extending material directing side wall extend downwardly toward each other.

* * * * *

UNITED STATES PATENT AND TRADEMARK OFFICE
CERTIFICATE OF CORRECTION

Page 1 of 1

PATENT NO. : 9,650,216 B2
APPLICATION NO. : 14/158158
DATED : May 16, 2017
INVENTOR(S) : C. John Allegretti It is certified that error appears in the above-identified patent and that said Letters Patent is hereby corrected as shown below:

In the Claims

Claim 1, Column 8, Line 43 insert --pallet holding walls connected to and extending upwardly from a plurality of-- between "of" and "the"

Signed and Sealed this
Eleventh Day of July, 2017

Joseph Matal
*Performing the Functions and Duties of the*
*Under Secretary of Commerce for Intellectual Property and*
*Director of the United States Patent and Trademark Office*